(12) United States Patent
Shekleton et al.

(10) Patent No.: US 6,399,204 B1
(45) Date of Patent: Jun. 4, 2002

(54) FLEXIBLE MULTI-LAYER GASKETING PRODUCT

(75) Inventors: Laura E. Shekleton, Fairport; Kenneth L. Hill, Newark; Timothy J. Hurley, Fairport, all of NY (US)

(73) Assignee: Garlock, Inc., Palmyra, NY (US)

( * ) Notice: Subject to any disclaimer, the term of this patent is extended or adjusted under 35 U.S.C. 154(b) by 0 days.

(21) Appl. No.: 09/491,552

(22) Filed: Jan. 26, 2000

(51) Int. Cl.$^7$ ................................................. B32B 9/00
(52) U.S. Cl. ...................... 428/408; 252/502; 277/938; 277/944; 428/66.4; 428/297.4; 428/402; 428/446; 428/448
(58) Field of Search ................................ 277/938, 935, 277/944; 428/66.4, 408, 297.4, 402, 66.6, 448, 446, 688; 423/448; 252/502

(56) References Cited

U.S. PATENT DOCUMENTS

| | | | |
|---|---|---|---|
| 3,404,061 A | * | 10/1968 | Shane et al. |
| 3,873,168 A | * | 3/1975 | Viola et al. |
| 4,223,897 A | | 9/1980 | Staab et al. |
| 4,282,288 A | | 8/1981 | Yoshino et al. |
| 4,443,517 A | | 4/1984 | Shah |
| 4,529,653 A | | 7/1985 | Hargreaves et al. |
| 4,591,166 A | | 5/1986 | Atkinson et al. |
| 4,620,995 A | | 11/1986 | Otomo et al. |
| 4,911,972 A | | 3/1990 | Mercuri |
| 4,961,991 A | | 10/1990 | Howard |
| 4,977,205 A | | 12/1990 | Bauer et al. |
| 5,149,518 A | | 9/1992 | Mercuri et al. |
| 5,286,574 A | | 2/1994 | Foster |
| 5,437,920 A | | 8/1995 | Bauer et al. |
| 5,447,785 A | * | 9/1995 | Kishi et al. |
| 5,478,048 A | | 12/1995 | Salesky et al. |
| 5,492,336 A | | 2/1996 | Barna et al. |
| 5,603,513 A | | 2/1997 | Shekeleton |
| 5,722,670 A | | 3/1998 | Novak et al. |
| 5,765,838 A | | 6/1998 | Ueda et al. |
| 5,830,809 A | | 11/1998 | Howard et al. |
| 5,902,762 A | | 5/1999 | Mercuri et al. |

OTHER PUBLICATIONS

"Grafoil", Flexible Graphite Sheets, UCAR Carbon Company, Inc., 1988, various catalog sheets (6 sheets).*

International Search Report, PCT/US01/02375, Apr. 18, 1901.

* cited by examiner

Primary Examiner—Deborah Jones
Assistant Examiner—Wendy Boss
(74) Attorney, Agent, or Firm—Cummings & Lockwood

(57) ABSTRACT

A substantially adhesive-free flexible multi-layer graphite based product comprising a first and second outer graphite layer and a layer intermediate to the first and second outer graphite layers, wherein said first and second outer graphite layers comprise at least about 30% flake graphite and said intermediate layer comprises between about 5% to about 20% elastomeric polymer and between about 5 to about 40% fiber.

30 Claims, 1 Drawing Sheet

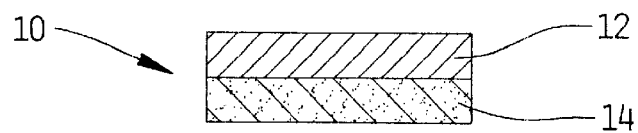
FIG_1
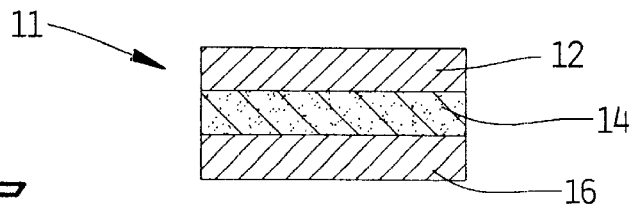
FIG_2
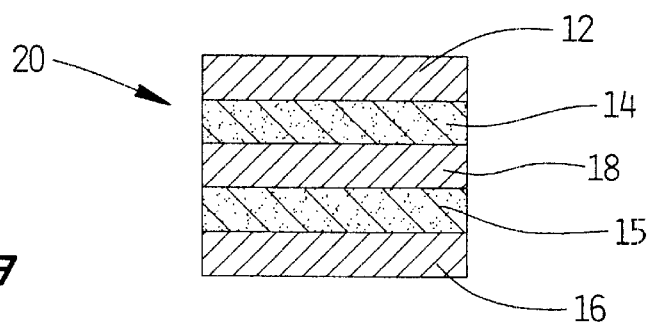
FIG_3
FIG_4
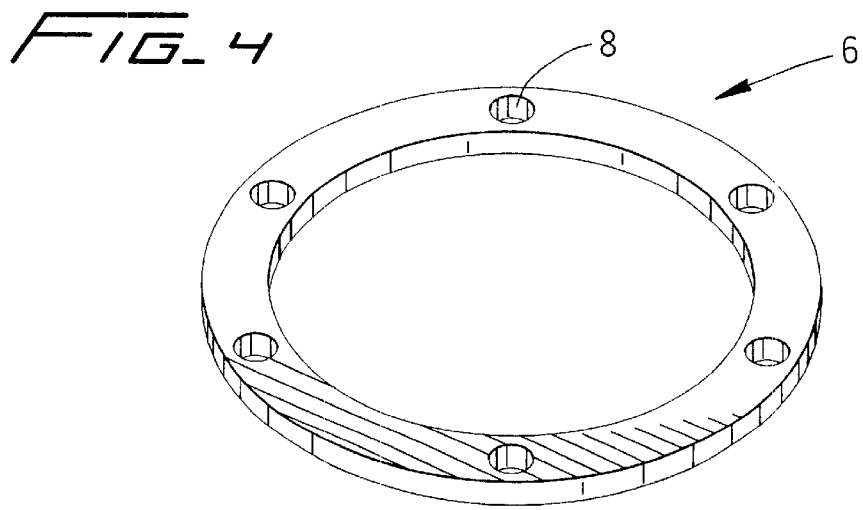

FLEXIBLE MULTI-LAYER GASKETING PRODUCT

BACKGROUND OF THE INVENTION

1. Field of Invention

The present invention relates to a flexible multi-layer gasketing product having high thermal stability and good sealing properties. More particularly, the present invention relates to an improved multi-layer gasketing product that does not require employment of adhesive between the layers and which comprises a non-expanded graphite layer and a fibrous layer.

2. Background of the Related Art and Information Disclosure Statement

Gasketing products are used in many applications to seal adjacent surfaces so as to prevent fluid leakage. A variety of materials are used in gasket manufacture, the particular materials used in the fabrication being chosen to meet the particular conditions under which the gasketing product is to perform. For example, vegetable fiber-based gasketing is often used to seal hot and cold liquids in applications wherein the pressure is relatively low (less than 300 psi). On the other hand, graphite-based gasketing is frequently used in pumps where the gasket may be exposed to relatively high pressure (up to 10,000 psi) and/or may be exposed to corrosive media. Neoprene-based gaskets are frequently employed in applications wherein compressibility is a factor, such as when two irregular joint flanges are to be joined together to effectuate a seal. Polymeric aromatic polyamide-based gasketing (such as aramid or Kevlar®) with a nitrile or SBR binder, offers good temperature and pressure resistance lending itself to be used for steam, gases and mild caustic sealing.

There are a number of characteristics that are typically desired in a gasketing product: (1) the material comprising the gasket should be relatively inert to prevent reaction of the gasket with its ambient environment and the surfaces it is designed to seal; (2) the material comprising the gasket should not stick to the parts against which the gasket is intended to bear; (3) the material comprising the gasket should have high wear resistance to provide for a gasket with a relatively long service life; (4) the material should be easily handable and not friable in nature; (5) the material should provide for compressibility of the gasket; and the (6) the materials comprising the gasket should be relatively inexpensive.

One particularly useful material for fabricating gaskets is graphite. Graphite is used in gasketing products because of its relative non-reactivity to other chemical compounds, its ability to resist both corrosive and non-corrosive media, its low coefficient of friction, and its excellent thermal stability.

Graphite is made up of substantially flat planes of hexagonally arranged carbon atoms, which are oriented so as to be substantially parallel and equidistant to one another. Natural graphites may be characterized as superposed laminated structures of carbon atoms joined together by weak Van der Waals forces. The laminae are linked together in groups known as crystallites.

In order to be useful in most sealing applications, graphite-based gaskets must be flexible. So-called "flexible graphite" is therefore conventionally used in most graphite containing gaskets. The term "flexible graphite" refers to the exfoliated reaction product of rapidly heated natural graphite particles which have been treated with an agent that intercalates into the crystal-structure of graphite to expand the intercalated particles at least 80 or more times in the direction perpendicular to the carbon layers in the crystal structure. A preferred intercalating agent is a solution of a mixture of sulfuric acid and an oxidizing agent. A conventional process for producing a flexible graphite sheet is described in U.S. Pat. No. 3,404,061 to Shane et al. Such process comprises treating the natural graphite particles with a suitable oxidizing agent, heating the treated particles to permit a natural expansion and then compressing and compacting the heated particles to form a flexible integrated sheet. Typical oxidizing agents include nitric acid, potassium chlorate, hydrogen peroxide, chromic acid, potassium permanganate, potassium chromate, potassium dichromate, and perchloric acid.

Flexible graphite-based gasketing products exhibit excellent temperature resistance, maintaining integrity from cryogenic temperatures to temperatures over 5400° F. in inert or reducing atmospheres, and up to approximately 850° F. in oxidizing atmospheres. Such products further exhibit very low creep relaxation (about 5%), excellent compressibility and conformability, and excellent chemical resistance (except for concentrated highly oxidizing mineral acids). Flexible graphite-based gaskets, however, suffer from a number of disadvantages, including, the adhesion of the graphite to mating surfaces, exhibition of a low resistance to compressive forces in particular after exposure to fluids such as oil or antifreeze, a lack of resiliency after compression, and a lack of inherent tensile strength which results in a tendency of such gaskets to break during handling in particular when bent.

In an attempt to take advantage of the desirable characteristics of graphite as a sealing agent, while avoiding its drawbacks, numerous manufacturers have proposed graphite-based gaskets fabricated from composite blends, and manufactured as laminates.

Gaskets made from composite materials that include graphite portend improved physical properties while generally offering the advantage of ease of manufacture. U.S. Pat. No. 4,282,288 discloses a graphite composite comprising a natural flake graphite bound with a binder such as coal tar or coal pitch which has been heat fixed. U.S. Pat. No. 4,443,517 discloses a fiber-reinforced graphite composition comprising a mass of intermeshed fibers bonded to one-another at points of contact by a binder and graphite distributed throughout the intermeshed fibers in an amount of from about 45% to about 95% of the total weight of the material. U.S. Pat. No. 5,286,574 discloses a composite gasket material, which is said to provide for, improved sealability and thermal stability. Such composite includes a fiber component, elastomeric binder component and a solid filler component that includes as a component a salt formed from a multivalent metal cation and a sterically hindered dicarboxylic acid. U.S. Pat. No. 4,529,653 discloses a non-asbestos flexible sheet material useful as a gasket which comprises graphite along with clay, silicate, cellulose fibers, starch and rubber. Such patent asserts improved flexibility and tensile strength. U.S. Pat. No. 5,902,762 discloses a sheet useful for forming gaskets formed from resin-impregnated flexible material which has embedded ceramic fibers extending from the surface of the sheet into the sheet. The ceramic fibers increase the permeability of the sheet to resin.

U.S. Pat. Nos. 4,977,205 and 5,437,920, both assigned to Frenzelit-Werke GmbH & Co. KG, describe composite sealing materials employing fibrillated organic fibers, flaked graphite and an elastomeric organic binder. U.S. Pat. No. 4,977,205 discloses a composite comprising between about 10% to about 70% by weight flake graphite having a particle size of 50 um to 250 um, between about 5% to about 20% by weight of an elastomer, and between about 5% to about 30% by weight process fiber, which preferably are aramids. U.S. Pat. No. 5,437,920 describes a composite comprising at least about 60% by weight finely divided graphite powder, from about 3% to about 5% elastomeric resin binder, and between about 2.5 to about 5.5% fiber of which about 0.5% to about 1.5% by weight is non-fibrillated fibers, and of which about 2 to about 4% by weight is fibrillated organic fibers.

Flexible graphite laminates have also been proposed for use as gaskets in various sealing applications. Laminates offer the possibility of maximizing the amount of graphite which is exposed to any conjoining surface. Many of these laminates contain metal or plastic sheets bonded between two sheets of flexible graphite material. The interlayer provides for an increase in strength and may improve the ease of handling of the laminate during cutting to form gaskets. Metal interlayers in particular offer the advantage of improved resistance to blowout, reduced high temperature creep of the gasket, and increased strength.

U.S. Pat. No. 5,722,670 discloses a graphite laminate gasket having two metallic layers interposed between graphite overlayers with each metallic layer having a different coefficient of expansion to maximize the gaskets sealing ability when placed between two opposing surfaces having different rates of expansion (and thus create shear forces which act differently against the surfaces of the interposed gasket). Laminates utilizing an interposed polymer resin coated cloth, such as polytetrafluoroethylene coated fiberglass cloth, are also known (See, e.g., U.S. Pat. No. 4,961, 991).

A problem associated with laminates employing graphite is that inevitably an adhesive material is incorporated. Adhesives may vaporize upon heating leaving a porous body, which permits leakage. Adhesives may also soften at elevated temperature and increase the probability of failure of the gasket. U.S. Pat. No. 5,830,809 proposes a laminate graphite gasket which avoids the use of adhesive comprising a flexible graphite layer to which a very thin thermoplastic polymer film, preferably under three mils in thickness, is fusion bonded. Fusion bonding of the thermoplastic polymer film to the graphite is performed by raising the temperature of the thin film at the interface thereof in contact with the flexible graphite while maintaining the interface of the thin thermoplastic polymer film not in contact with the flexible graphite at a temperature below said softening point. Unfortunately such process is limiting and does not provide a method for producing other types of advantageous laminates.

Many gaskets incorporate polymeric materials which do not have sufficient thermal resistance to withstand high temperatures encountered in certain applications, such as at the exhaust muffler of an air-cooled engine. Further, prior art gaskets comprising relatively high levels of graphite on the surface of the gasket suffer from the tendency of the surface graphite layer to crack and break when subjected to bending during handling. Breakage of the outer graphite layer may compromise the integrity of the gasket seal.

There is therefore a need in the art for a gasket which employs graphite on the surface of the gasket, displays improved strength and resiliency, reduces the tendency of the graphite surface layer to crack upon bending, and which does not require the employment of heat-sensitive adhesives.

BRIEF SUMMARY OF THE INVENTION

The present invention provides an improved multi-layer gasket product, which comprises a non-expanded graphite layer and a fibrous layer. The improved gasket product provides significantly better flexibility/handability over conventional graphite-based products, reducing significantly the propensity of such gasketing product to crack or break upon bending.

An aspect of the present invention comprises a multi-layer structure wherein at least one outer layer of the laminate comprises at least about 30%, more preferably at least about 45%, and yet more preferably at least about 60% graphite. The multi-layer structure includes at least one intermediate layer in contact with the outer graphite layer that comprises between about 5–25% elastomeric polymer, and between about 5%–40% fiber. Unexpectedly, it has been found that a graphite layer comprising more than about 50% flake graphite can be adjoined to a fibrous material layer by use of pressure without the need for an adhesive. Unexpected and commercially practicable adhesion was in particular discovered when the fibrous material is in a highly fibrillated form such that it has a surface area greater than 5 $m^2/gm$, and more advantageously, when the fibrillated fibrous material is an aromatic polyamide. More preferably, the intermediate layer of the laminate also comprises an elastomeric organic binder which may be selected from the group consisting of acrylonitrile-butadiene rubber, butyl rubber, chloroprene, ethylene-propylene-diene rubber, neoprene, polyisobutylene, polyisoprene, styrene-butadiene rubber, and the like. Nitrile-containing polymers/co-polymers were found in particular to advantageously enhance adhesion between the laminate layers while providing unexpected flexibility to the graphite layer protecting against cracking due to bending of the material. In particular, nitrile rubber was seen to provide advantageous flexibility along with advantageous laminar binding properties. A preferred nitrile rubber was polyacrylonitrile butadiene rubber. Preferred fibrous materials include aramid fiber (p-phenylene terephthalamide polymer), an organic fiber; carbon fiber, an organic fiber; and mineral wool, an inorganic fiber (mineral wool is made from molten slag, rock or glass, or a selected combination of the same, by blowing and drawing). Preferably the intermediate layer of the laminate containing the fibrous material further contains from about 10% to about 90% of a silicate, preferably aluminum silicate, and more preferably hydrated aluminum silicate, which surprisingly was found when added to the intermediate layer to improve the binding between the graphite layer and the intermediate fibrous/elastomeric polymer layer.

Also disclosed is a homogenous graphite flexible product comprising between 30% and 70% graphite flake, between 5% and 20% elastomeric polymer, between 5% and 25% fiber, and between 10% and 90% silicate, preferably aluminum silicate, and more preferably hydrated aluminum silicate. Unexpectedly good adhesion between the components was found when the fibrous material was fibrillated such that it has a surface area greater than 5 $m^2/gm$. Advantageously, the highly fibrillated fibrous material is an aromatic polyamide. Such homogenous graphite flexible product was found to be compressible into a unified mass by calendering without the need to add adhesives.

It has been discovered that flake graphite which is not expanded or exfoliated ("non-exfoliated" flake graphite), may be advantageously employed in the present invention. Presently available commercial graphite-based gaskets, composites and laminates, typically employ expanded, or exfoliated, graphite—that is formed by intercalation of the flakes with oxidizing agents by way of heat treatment. The present invention goes against this convention. It also provides for the production of a flexible multi-layer gasket that does not require adhesives to be employed in order to bind layers.

In one embodiment of the present invention, there is provided a substantially adhesive-free flexible multi-layer graphite based gaskets comprising a first and second outer graphite layer and an intermediate layer intermediate to said first and second outer graphite layers, wherein said first and second outer graphite layers comprise at least about 30% to about 70% flake graphite, more preferably at least about 60% flake graphite, and said intermediate layer comprises between about 5% to about 20% elastomeric polymer and between 5 to 40% fiber. Preferably the fiber of the intermediate layer has a surface area greater than 5 $m^2/gm$, and is preferably an aramid fiber. The first and second outer layers may further comprise fillers, including, but not limited to, hydrated aluminum silicate. Preferably the intermediate layer further comprises between about 10 to about 90% hydrated aluminum silicate.

Another embodiment of the present invention is a multi-layer gasketing product having an upper face layer and a lower face layer, each of the upper and lower face layers comprising at least about 30% to about 70% flake graphite by weight, more preferably at least about 50% flake graphite, and less than 25% by weight fiber, and at least one layer intermediate to the upper face layer and the lower face layer comprising between about 10% to about 40% by weight fiber and between about 5% to 20% by weight elastomeric polymer. Preferably the fiber of the intermediate layer is highly fibrillated, having a surface area greater than 5 $m^2/gm$ of fiber, and is an aramid fiber. Each of the upper and lower face layers may further comprises fillers, including, but not limited to, hydrated aluminum silicate. Preferably the intermediate layer further comprises between about 10 to about 90% hydrated aluminum silicate.

And yet another embodiment of the present invention is a non-asbestos homogenous gasketing product comprising between about 30% to about 70% by weight graphite flake, between 5%–20% of an elastomeric polymer, between about 5% to about 25% fiber of which 2%–10% is fibrillated highly fibrillated fiber having a surface area greater than 5 $m^2/gm$ and between about 10% to about 90% silicate. Preferably the silicate is hydrated aluminum silicate and the highly fibrillated fiber is an aramid fiber. As such composite does not require adhesive or resins for adhesion of the components, it is preferred that the product be substantially devoid of adhesives.

BRIEF DESCRIPTION OF THE DRAWINGS

Further objects, features and advantages of the invention will become apparent from the following description and drawings. The following drawings illustrate various aspects of the present invention. They are not, however, to be construed as limiting the claims in any manner whatsoever.

FIG. 1 is a cross-sectional view of a two-layer laminate of the present invention.

FIG. 2 is a cross-sectional view of a three-layer laminate of the present invention.

FIG. 3 is a cross-sectional view of a five-layer laminate of the present invention.

FIG. 4 is a perspective view illustrating a sample gasketing product which may be constructed in accordance with the present invention.

DETAILED DESCRIPTION OF THE INVENTION AND PREFERRED EMBODIMENTS

The present inventors have developed an exceptionally flexible gasketing product and multi-layer structures which offers advantages similar to conventional exfoliated graphite gasketing but which employs non-exfoliated graphite and which does not require employment of adhesive in its fabrication. As exfoliation of graphite entails several manufacturing steps, the employment of flake graphite in the present invention offers potential savings in manufacturing costs. Further, as no adhesive need be used in the manufacture of the multi-layer gasketing product of the present invention, the multi-layer gasketing product of the present invention need not suffer from a number of potential problems associated with conventional graphite laminates including, adhesive vaporization or softening, and contamination of media exposed to the material.

Multi-layer structures of the present invention comprising both an non-exfoliated graphite layer and an underlying fibrous layer offer improved properties over presently available graphite-based gasket products. Gaskets fabricated from the multi-layer structures of the present invention display improved strength and resiliency and a significantly reduced tendency to crack upon bending as compared to prior art laminates. As adhesive is not required to form the multi-layer structures, the concerns of contamination with, and break-down of, adhesive need not be present when employing gaskets of the present invention.

A preferred fiber of the present invention is highly fibrillated and has a surface area greater than 5 $m^2/gm$ and includes organic-based fibers such as aramid fibers (p-phenylene terephthalamide polymer) or carbon fibers and inorganic-based fibers such as mineral wool (mineral wool being formed from molten slag, rock or glass—or a selected combination of the same—by blowing and drawing). A preferred graphite is non-exfoliated flake graphite having a particle size of approximately 25 $\mu$m. A preferred elastomeric polymer for use in the described gaskets is a nitrile-containing elastomer, for example, nitrile rubber (polyacrylonitrile butadiene rubber). Preferably a silicate, more aluminum silicate, and yet more preferably hydrated aluminum silicate, is incorporated into any multi-layer structure.

A composite graphite sheet of the present invention is preferably homogenous. A preferred homogenous graphite sheet comprises between about 30% to about 70% non-exfoliated graphite flake, about 5–20% elastomeric polymer, about 5 to about 25% fiber, preferably a highly fibrillated fiber having a surface area greater than 5 $m^2/gm$ of fiber, and between about 10 to about 90% silicate. Preferably the composite graphite sheet does not comprise a thermally-labile adhesive, or comprises an insubstantial amount of such materials (such that any fluid in which it is intended to come into contact with will not be contaminated with the adhesive or a break-down product thereof).

A preferred multi-layer structure comprises an outer layer comprising at least about 30% graphite, more preferably at least about 45% graphite, and yet more preferably at least about 60% graphite. Preferably the graphite is non-exfoliated graphite flake. The intermediate layer in contact with one or more outer graphite layer comprises preferably between about 5% to about 20% elastomeric polymer, preferably an elastic polymer having nitrile moieties ("nitrile elastomer") such as nitrile rubber (polyacrylonitrile butadiene rubber), between about 5% to about 40% fiber, more preferably between about 10% to about 40% fiber, preferably a highly fibrillated fiber having a surface area greater than 5 m²/gm. The fiber is more preferably an aromatic polyamine fiber such as aramid fiber (p-phenylene terephthalamide polymer) or an inorganic fiber such as mineral wool fiber. It is preferred that between about 10% to about 90% of a silicate, preferably aluminum silicate, more preferably hydrated aluminum silicate, is added to the intermediate layer.

Now turning to the drawings, there is shown in FIG. 1 a cross-sectional view of a two-layer structure of the present invention. Two-layer structure 10 is formed from a composite layer of flake graphite 12 and a composite layer of highly fibrillated fiber 14. Composite flake graphite layer 12 preferably comprises at least about 50% flake graphite, and may include other materials such as fibers, polymers, and fillers, as for example, described in U.S. Pat. Nos. 4,988,205 and 5,437,920, incorporated by reference herein. Composite highly fibrillated fiber layer 14 comprises between 5 to 40% fiber (preferably highly fibrillated), and between 5–20% elastomeric polymer, and may further include 10 to 90% silicate or other fillers to improve the cohesiveness of the materials comprising fibrillated fiber layer 14. As shown in FIG. 2, a lower flake graphite layer 16 may be added to the two-layer structure of FIG. 1 to provide for a three-layer structure 11. Lower flake graphite layer 16 may comprise the same or similar composition as found in composite flake graphite layer 12.

FIG. 3 illustrates a cross-sectional view of a homogeneous structure 20 of the present invention, comprising flake graphite, a fiber composite and elastomeric organic binder.

FIG. 4 illustrates a donut-shaped gasket 6 having six equally distant holes 8 spaced along the gasket. Each hole 8 transverses the gasket body to accommodate fasteners, such as a bolt and nut assembly, among other things. Gasket 6 is an example of the type of gasketing product which may be constructed in accordance with the present invention.

While the invention has been described with respect to preferred embodiments, those skilled in the art will readily appreciate that various changes and/or modifications can be made to the invention without departing from the spirit or scope of the invention as defined by the appended claims.

What is claimed is:

1. A substantially adhesive-free flexible graphite multi-layer gasketing product comprising a first outer graphite layer, a second outer graphite layer and an intermediate layer between said first and second outer graphite layers, wherein said first and second outer graphite layers comprise at least about 30% flake graphite and said intermediate layer comprises between about 5% to about 20% elastomeric polymer and between about 5% to about 40% fiber.

2. The multi-layer structure of claim 1 wherein said first and second outer graphite layers comprise at least about 60% flake graphite.

3. The multi-layer structure of claim 1 wherein said intermediate layer comprises between 10 to 25% fiber.

4. The multi-layer structure of claim 1 wherein said fiber of said intermediate layer is comprised of 2 to 10% of a highly fibrillated fiber.

5. The multi-layer structure of claim 1 wherein said fiber of said intermediate layer has a surface area greater than 5 m²/gm of fiber.

6. The multi-layer structure of claim 1 wherein said first and second outer layers further comprise fillers.

7. The multi-layer structure of claim 6 wherein said fillers of said first and second outer layers comprise hydrated aluminum silicate.

8. The multi-layer structure of claim 1 wherein said intermediate layer further comprises between about 10 to about 90% hydrated aluminum silicate.

9. The multi-layer structure of claim 5 wherein the fibrillated fiber is an aramid fiber.

10. A multi-layer gasketing product having an upper face layer and a lower face layer, each of said upper and lower face layers comprising at least about 30% flake graphite by weight and less than about 25% by weight fiber, and at least one layer intermediate to said upper face layer and said lower face layer comprising between about 5% to about 40% by weight fibrillated fiber and between about 5% to about 20% by weight organic elastomer.

11. The multi-layer gasketing product of claim 10 wherein each of said upper and lower face layers comprise at least about 50% flake graphite by weight.

12. The multi-layer gasketing product of claim 11 wherein said at least one intermediate layer comprises between about 10% to about 40% by weight fiber.

13. The multi-layer structure of claim 10 wherein said fiber of said intermediate layer is highly fibrillated.

14. The multi-layer structure of claim 10 wherein said fiber of said intermediate layer has a surface area greater than 5 m²/gm.

15. The multi-layer structure of claim 10 wherein each of said upper and lower face layers further comprises fillers.

16. The multi-layer structure of claim 10 wherein said fillers of said upper and lower face layers comprise hydrated aluminum silicate.

17. The multi-layer structure of claim 10 wherein said intermediate layer further comprises between about 10 to about 90% hydrated aluminum silicate.

18. The multi-layer structure of claim 10 wherein the fibrillated fiber is an aramid fiber.

19. A non-asbestos homogenous gasketing product comprising between about 30% to about 70% by weight graphite flake, between about 5% to about 25% fiber having a surface area greater than 5 m²/gm, between about 5% to about 20% elastomeric polymer, and between about 10% to about 90% silicate.

20. The product of claim 19 wherein the silicate is hydrated aluminum silicate.

21. The product of claim 19 wherein the fiber is an aramid fiber.

22. The product of claim 19 wherein the product is substantially devoid of adhesives.

23. A substantially adhesive-free flexible graphite multi-layer gasketing product comprising:
(a) a first outer graphite layer and a second outer graphite layer, said first and second outer graphite layers comprising fillers and at least about 30% flake graphite; and
(b) an intermediate layer adjacent said first and second outer graphite layers and comprising between about 5% to about 20% elastomeric polymer and between about 5% to about 40% fiber.

24. The multi-layer structure of claim 23 wherein said fillers of said first and second outer layers comprise hydrated aluminum silicate.

25. The multi-layer structure of claim 23 wherein said fiber of said intermediate layer is comprised of 2 to 10% of a highly fibrillated fiber.

26. The multi-layer structure of claim 23 wherein said fiber of said intermediate layer has a surface area greater than 5 m²/gm of fiber.

27. A substantially adhesive-free flexible graphite multi-layer gasketing product comprising:
(a) a first outer graphite layer and a second outer graphite layer, said first and second outer graphite layers comprising between about 10% to about 90% hydrated aluminum silicate and at least about 30% flake graphite; and (b) an intermediate layer adjacent said first and second outer graphite layers and comprising between about 5% to about 20% elastomeric polymer and between about 5% to about 40% fiber.

28. A multi-layer gasketing product having an upper face layer and a lower face layer, each of said upper and lower face layers comprising fillers and at least about 30% flake graphite by weight and less than about 25% by weight fiber, and at least one layer intermediate to said upper face layer and said lower face layer comprising between about 5% to about 40% by weight fibrillated fiber and between about 5% to about 20% by weight organic elastomer.

29. The multi-layer structure of claim 28 wherein said fillers of said upper and lower face layers comprise hydrated aluminum silicate.

30. The multi-layer structure of claim 28 wherein said intermediate layer further comprises between about 10% to about 90% hydrated aluminum silicate.

* * * * *